(12) United States Patent
Togashi et al.

(10) Patent No.: US 7,054,134 B2
(45) Date of Patent: May 30, 2006

(54) STACKED CAPACITOR

(75) Inventors: Masaaki Togashi, Yuri-gun (JP); Tatsuya Fukunaga, Yuri-gun (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/152,333

(22) Filed: Jun. 15, 2005

(65) Prior Publication Data

US 2005/0286203 A1    Dec. 29, 2005

(30) Foreign Application Priority Data

Jun. 29, 2004    (JP)    ............... 2004-192086

(51) Int. Cl.
*H01G 4/30*    (2006.01)
(52) U.S. Cl. ............... 361/301.4; 361/306.1; 361/308.1; 361/309
(58) Field of Classification Search ............ 361/301.4, 361/303, 306.1, 306.2, 306.3, 308.1, 311–312, 361/321.2, 321.3, 309–310
See application file for complete search history.

(56) References Cited

U.S. PATENT DOCUMENTS

| | | | | |
|---|---|---|---|---|
| 5,880,925 A | * | 3/1999 | DuPre et al. | ............ 361/303 |
| 6,292,351 B1 | * | 9/2001 | Ahiko et al. | ............ 361/306.3 |
| 6,407,906 B1 | * | 6/2002 | Ahiko et al. | ............ 361/306.1 |
| 6,657,848 B1 | * | 12/2003 | Togashi et al. | ............ 361/306.3 |

FOREIGN PATENT DOCUMENTS

| | | | |
|---|---|---|---|
| JP | 10256076 A | * | 9/1998 |
| JP | A 2000-208361 | | 7/2000 |
| JP | A 2001-185441 | | 7/2001 |
| JP | A 2001-284171 | | 10/2001 |
| JP | 2004140211 A | * | 5/2004 |

* cited by examiner

*Primary Examiner*—Anthony Dinkins
(74) *Attorney, Agent, or Firm*—Oliff & Berridge, PLC

(57) ABSTRACT

A stacked capacitor includes a dielectric member, a plurality of internal electrodes, and a plurality of extraction electrodes. The dielectric member is a stacked member formed of a plurality of sheet-like stacked dielectric layers and has at least one side surface. The internal electrodes fit within the surface area of the dielectric layers and are stacked alternately with the dielectric layers. Further, the internal electrodes have first edges positioned near the side surface. Each extraction electrode has an overlapping portion A overlapping another extraction electrode at the side surface in a direction orthogonal to the mounting direction.

4 Claims, 3 Drawing Sheets

STACKED CAPACITOR

BACKGROUND OF THE INVENTION

1. Field of the Invention

The present invention relates to a stacked capacitor capable of reducing equivalent series inductance (ESL).

2. Description of Related Art

In recent years, power sources have supplied lower voltages to central processing units (CPUs) provided in digital electronic equipment in order to reduce power consumption. On the other hand, as the operating frequency of today's CPUs continue to increase, it has become necessary to supply larger load currents to the CPU.

When current flows the wire in the CPU, voltage drop is caused by inductance of the wire. If the load current changes abruptly, larger voltage drop is caused. If the power source applies a low voltage to the CPU, it is impossible to ignore the voltage drop since slight changes in the voltage can lead to CPU's malfunctions. Therefore, the importance of stabilizing the voltage increases.

A stacked capacitor called a decoupling capacitor is connected to the power source in the CPU for stabilizing the power source. When rapid transient changes in the load current occur, current is supplied to the CPU from the stacked capacitor through rapid charging and discharging of the capacitor, thereby suppressing voltage changes in the power supply.

However, the decoupling capacitor has an equivalent series inductance (ESL). The voltage change $\Delta V$ is expressed by $\Delta V = ESL \times di/dt$ (the di/dt expresses the change in current). On the other hand, as the operating frequency in today's CPUs continues to improve, the change in current di/dt is larger and occurs more rapidly. Therefore, the ESL of the decoupling capacitor itself greatly affects voltage changes since the change in current di/dt is large. Since voltage change in the power source can be suppressed by reducing this ESL, various forms of stacked capacitors capable of reducing ESL have been proposed.

Generally a stacked capacitor is constructed of a dielectric member having sheet-like dielectric layers stacked alternately with internal electrodes having a surface area smaller than that of the dielectric layers. An extraction electrode leads from the internal electrode to the outer surface of the dielectric member. When current is supplied to the internal electrodes through the extraction electrodes, the ESL is generated by the current flowing through the internal electrodes.

In a conventional stacked capacitor disclosed in Japanese patent application publication No. 2000-208361, for example, the paths through which current flows are shortened by increasing the width of the extraction electrodes, while decreasing the gaps therebetween. Shortening the current paths reduces magnetic flux generated by the current, which results in less ESL.

Another stacked capacitor disclosed in Japanese patent application publication No. 2001-185441 attempts to reduce ESL by optimizing the ratio of a length L and a width W of the extraction electrodes. In another conventional stacked capacitor disclosed in Japanese unexamined patent application publication No. 2001-284171, ESL is reduced by providing adjacent extraction electrodes with opposite polarities so that magnetic flux generated in adjacent extraction electrodes cancels out each other due to current flowing therethrough.

SUMMARY OF THE INVENTION

However, as the transmission of digital signals has become faster in recent years, digital devices capable of operating at clock frequencies over 1 GHz have emerged. Since the inductance component of the capacitor impedes rapid charging and discharging of the capacitor, the coupling capacitors used for the digital device operating at such high clock frequencies should have a small inductance component in order to keep up with rapid changes and large currents. When the decoupling capacitor is used in the power circuit of a CPU that operates at a frequency of 1 GHz or greater, it is preferable that the ESL is 100 pH or less.

In view of the foregoing, it is an object of the present invention to provide a stacked capacitor capable of further reducing ESL in order to supply a stable voltage to a CPU or the like.

In order to attain the above object, the present invention provides a stacked capacitor including a dielectric element, a plurality of internal electrodes, and a plurality of extraction electrodes. The dielectric element has at least one side surface and includes a plurality of stacked sheet-like dielectric layers each defining a predetermined surface area. The plurality of internal electrodes is alternately stacked with the dielectric layers. Each internal electrode includes a conductor falling within the predetermined surface area and has a first edge positioned near the one side surface. The dielectric layers and the internal electrodes define a stacking direction. Each extraction electrode extends from each first edge to the one side surface without contact with one another. Neighboring extraction electrodes in a direction orthogonal to the stacking direction are partly overlapped with each other in the stacking direction on the side surface.

It is preferable that the stacked capacitor further includes insulating layers provided at areas on the side surface where the extraction electrodes overlap.

It is preferable that the stacked capacitor further includes a plurality of external electrodes provided on the side surface and extending in the stacking direction and arrayed in the orthogonal direction. Each external electrode is connected to a corresponding extraction electrode.

It is preferable that at least two extraction electrodes extend from each internal electrode.

BRIEF DESCRIPTION OF THE DRAWINGS

The above and other objects, features, and advantages of the invention will become more apparent from reading the following description of the preferred embodiments taken in connection with the accompanying drawings in which.

DETAILED DESCRIPTION OF THE PREFERRED EMBODIMENTS

Figure 1:
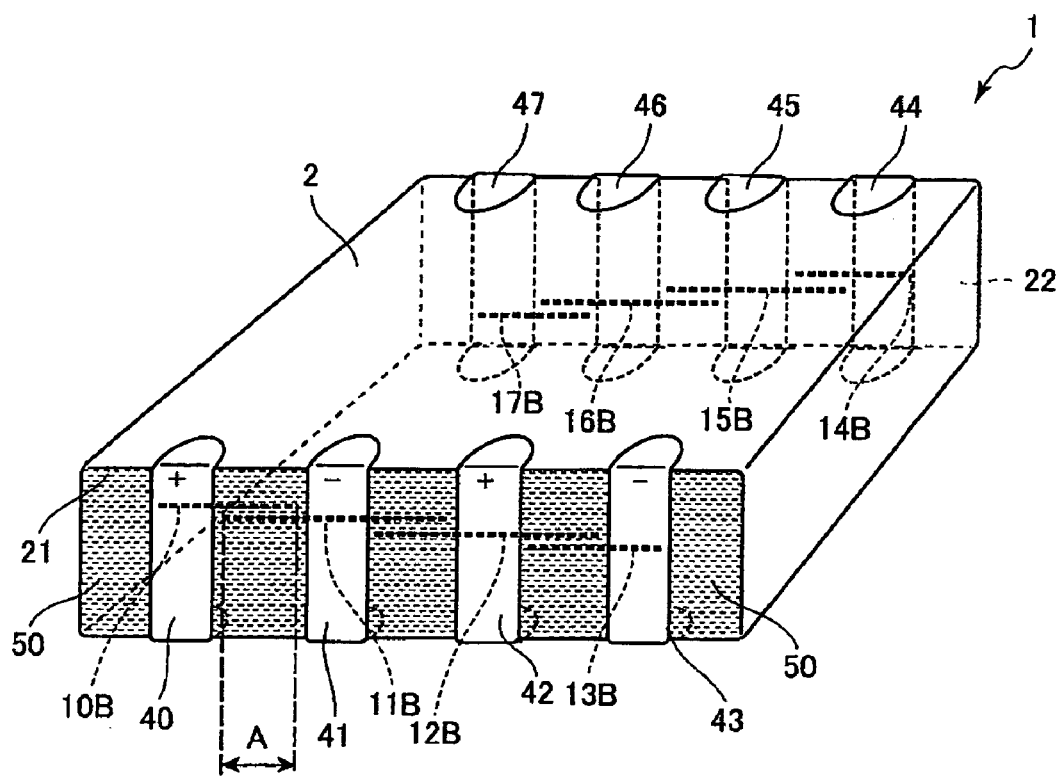
FIG. 1 is a perspective view showing a stacked capacitor according to a preferred embodiment of the present invention.
Figure 2:
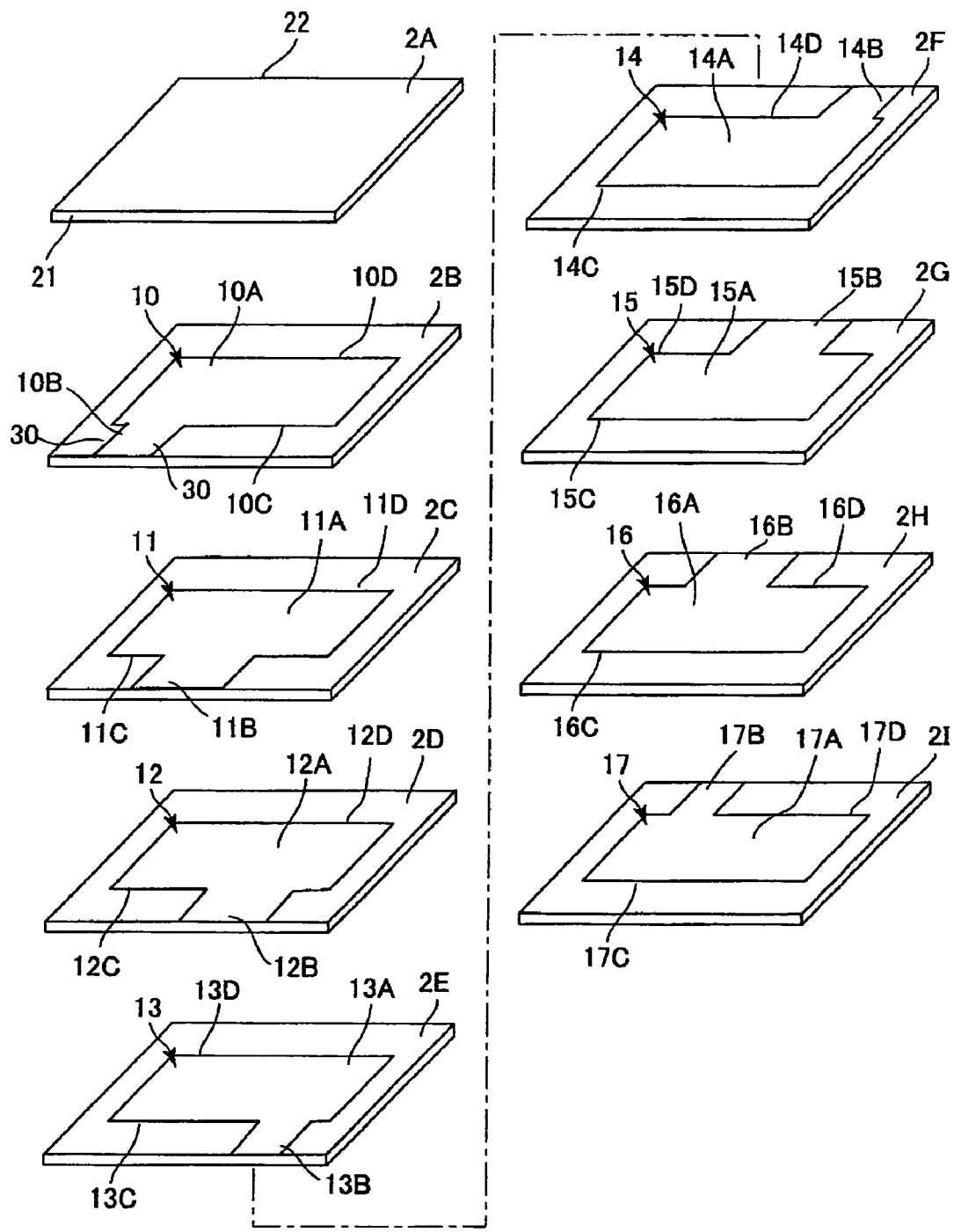
FIG. 2 is an exploded perspective view of the stacked capacitor according to the preferred embodiment.

A stacked capacitor 1 according to a preferred embodiment of the present invention will be described while referring to FIGS. 1 and 2. As shown in FIGS. 1 and 2, the stacked capacitor 1 includes a dielectric member 2, first through eighth electrodes 10–17, and external electrodes 40–47. The dielectric member 2 is constructed by stacking sheet-like dielectric layers 2A–2I that are substantially rectangular in shape. The dielectric member 2 has a first side surface 21 and a second side surface 22 opposing the first side surface 21 (only indicated for the dielectric layer 2A in FIG. 2). The dielectric member 2 is manufactured by stacking ceramic green sheets serving as the dielectric layers 2A–2I and sintering the stacked structure.

The first through eighth electrodes 10–17 are formed of a base metal such as nickel or a nickel alloy, copper or a copper alloy, or a metal alloy having one of these metals as the primary component. The first through eighth electrodes 10–17 are disposed on top of each of the dielectric layers 2B–2I, but not on the dielectric layer 2A. In this manner, the dielectric layers 2A–2I and electrodes 10–17 are stacked alternately. Each of the first through eighth electrodes 10–17 is provided one-to-one correspondence with internal electrodes 10A–17A and extraction electrodes 10B–17B. Each of the internal electrodes 10A–17A is substantially similar in shape, and falls within the surface area of the dielectric layers 2A–2I so as to overlap one another substantially in the stacking direction. Each of the internal electrodes 10A–17A is provided one-to-one correspondence with first edges 10C–17C positioned near the first side surface 21, and second edges 10D–17D positioned near the second side surface 22.

The extraction electrodes 10B–13B lead from the first edges 10C–13C to the first side surface 21 of the dielectric member 2 at positions that do not overlap in the stacking direction. The extraction electrodes 14B–17B lead from the second edges 14D–17D to the second side surface 22 of the dielectric member 2 at positions that do not overlap in the stacking direction. The extraction electrodes that are adjacent to one another in the stacking direction are also adjacent to one another on the first side surface 21 in a direction orthogonal to the stacking direction (hereinafter referred to as "orthogonal direction"). Each extraction electrode has an overlapping portion A that overlaps an adjacent extraction electrode when viewed in the stacking direction.

The external electrodes 40–43 are disposed on the first side surface 21 and spaced at prescribed intervals in the orthogonal direction and are connected one-to-one correspondence to the extraction electrodes 10B–13B. The external electrodes 44–47 are disposed on the second side surface 22 and spaced at prescribed intervals in the orthogonal direction and are connected one-to-one correspondence to the extraction electrodes 14B–17B. Providing the external electrodes in this way facilitates mounting the stacked capacitor 1 on a substrate or the like. The external electrodes do not have portions overlapping extraction electrodes connected to adjacent external electrodes in the direction orthogonal to the stacking direction.

Insulating layers 50 are provided between adjacent external electrodes in the orthogonal direction. When viewed from the first side surface 21 side, the extraction electrodes are disposed very near one another at the overlapping portions A. Therefore, it is conceivable that solder bridges and the like may be formed very readily during the mounting process, for example. However, by providing the insulating layers 50 between the external electrodes, the stacked capacitor 1 can prevent short circuiting caused by solder bridges or the like bridging adjacent extraction electrodes at overlapping portions A and between the adjacent external electrodes when mounting the stacked capacitor 1.

With the construction described above, the stacked capacitor 1 is used with the external electrodes 40, 42, 44, and 46 connected to the power supply and the external electrodes 41, 43, 45, and 47 connected to ground. Accordingly, the electric current flows in the extraction electrodes such that the direction of current is opposite between any two extraction electrodes adjacent in the stacking direction. Therefore, magnetic flux generated by the current in adjacent extraction electrodes effectively cancels out one another, thereby reducing ESL in the stacked capacitor 1. In such a case, decreasing the distance between extraction electrodes both in the stacking direction and the orthogonal direction increases magnetic coupling, which in turn increases the amount of cancelled magnetic flux. Further, increasing the width of the extraction electrodes in the orthogonal direction is also desirable for increasing the amount of cancelled magnetic flux. The width of the external electrodes should also be wide for the same reason.

In the stacked capacitor 1 of the preferred embodiment, each extraction electrode has an overlapping portion A. Since magnetic flux is cancelled at this overlapping portion A besides at non-overlapping portion, the stacked capacitor 1 can reduce ESL more than conventional capacitors having no such overlapping portions, thereby regulating fluctuations in voltage supplied to the CPU.

Figure 3:
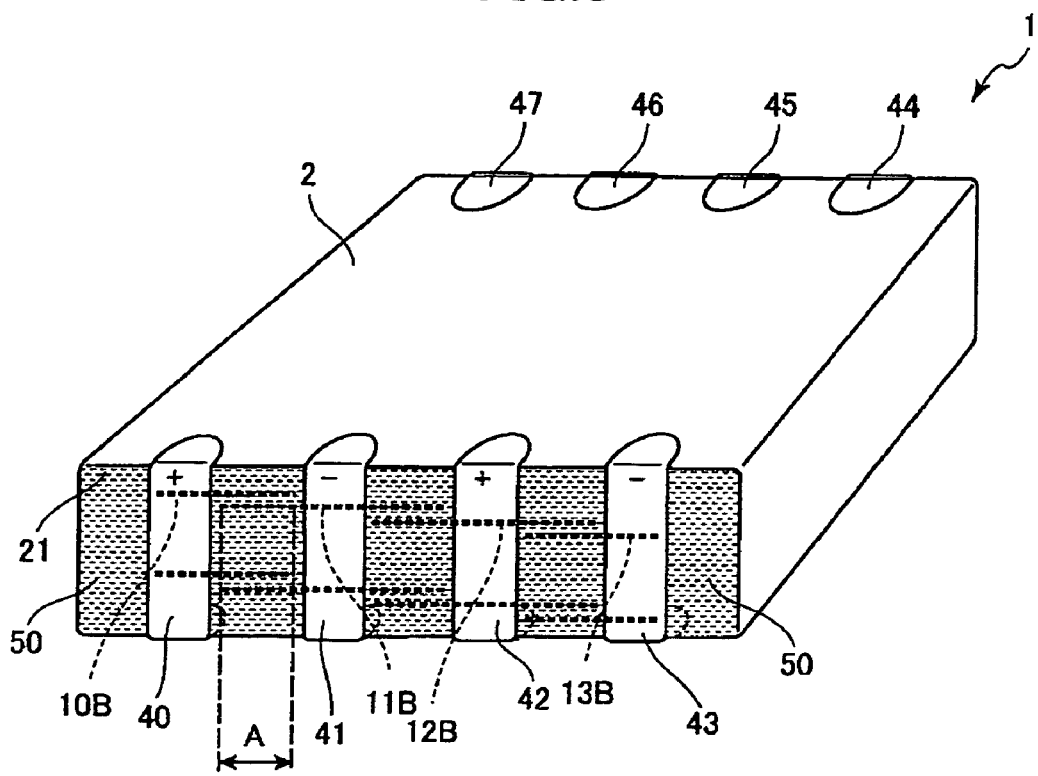
FIG. 3 is a perspective view of the stacked capacitor according to a first modification to the preferred embodiment, wherein the number of layers has been increased.
Figure 4:
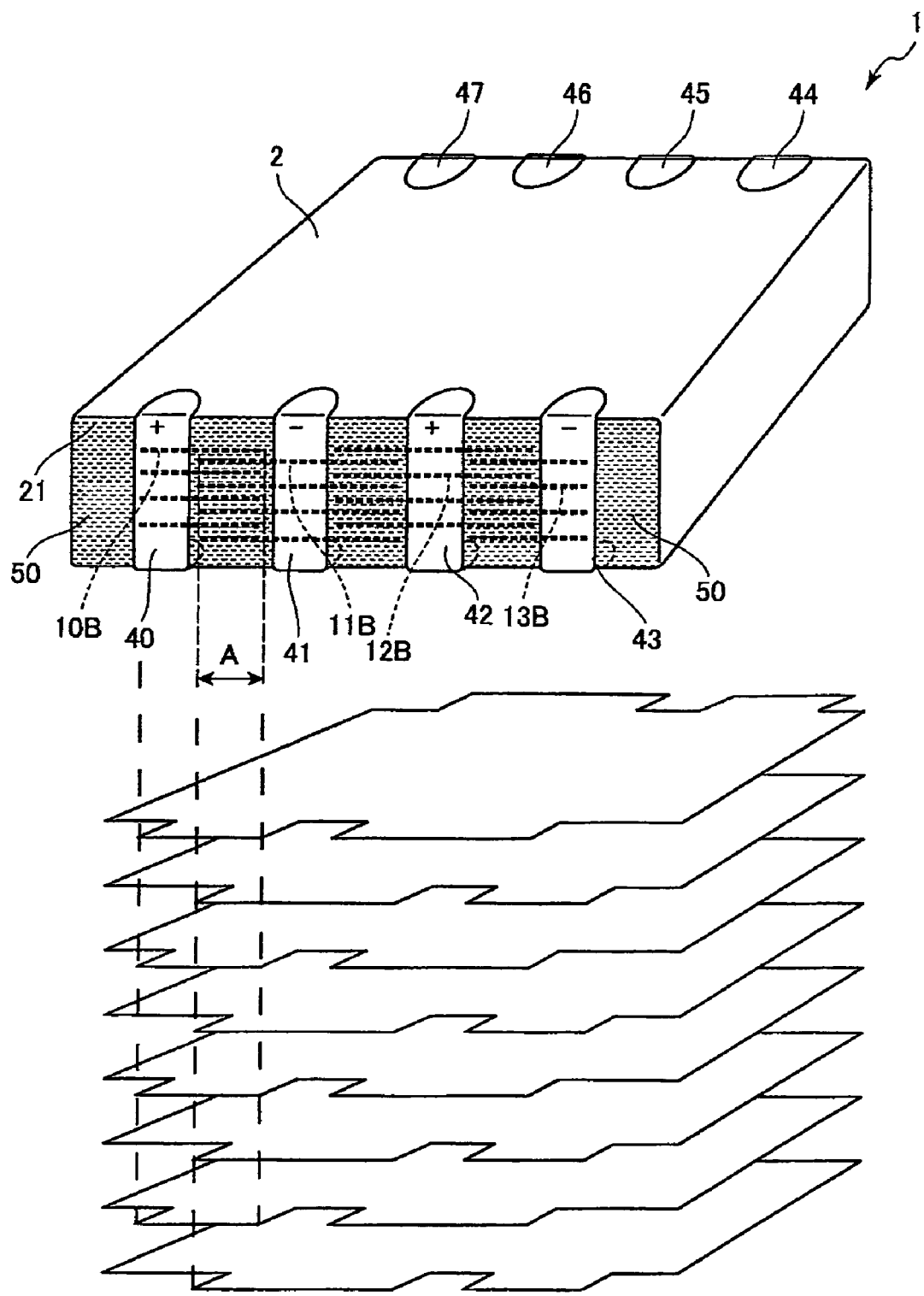
FIG. 4 is a perspective view of the stacked capacitor according to a second modification to the preferred embodiment, wherein a plurality of extraction electrodes leads out from a single internal electrode.

A first modification is shown in FIG. 3, where another set of the dielectric layers 2B–2I shown in FIG. 2 is added to the original stack. Further, a second modification is shown in FIG. 4, where upper half is a perspective view of the stacked capacitor and lower half is an exploded perspective view of the stacked capacitor. In the second modification, a plurality of extraction electrodes is led from a single internal electrode. In this case, the extraction electrodes led from the same internal electrode will have the same polarity.

While the invention has been described in detail with reference to specific embodiments thereof, it would be apparent to those skilled in the art that many modifications and variations may be made therein without departing from the spirit of the invention, the scope of which is defined by the attached claims. Further, it is not absolutely necessary to provide the external electrodes 40–47 and the insulating layers 50. In such a case, the extraction electrodes are directly connected to the substrate or the like.

What is claimed is:

1. A stacked capacitor comprising:

a dielectric element having at least one side surface and comprising a plurality of stacked sheet-like dielectric layers each defining a predetermined surface area;

a plurality of internal electrodes alternately stacked with the dielectric layers, each internal electrode comprising a conductor falling within the predetermined surface area and having a first edge positioned near the one side surface, the dielectric layers and the internal electrodes defining a stacking direction;

a plurality of extraction electrodes each extending from each first edge to the one side surface without contact with one another;

wherein neighboring extraction electrodes in a direction orthogonal to the stacking direction are partly overlapped with each other in the stacking direction on the side surface.

2. The stacked capacitor according to claim 1, further comprising insulating layers provided at areas on the side surface where the extraction electrodes overlap.

3. The stacked capacitor according to claim 1, further comprising a plurality of external electrodes provided on the side surface and extending in the stacking direction and arrayed in the orthogonal direction, each external electrode being connected to a corresponding extraction electrode.

4. The stacked capacitor according to claim 1, wherein at least two extraction electrodes extend from each internal electrode.

* * * * *